United States Patent Office 3,505,271
Patented Apr. 7, 1970

3,505,271
CASTING RESIN LUBRICATION
Rene Paul Brown, Paul Derald Meek, and Robert Harris Dyer, Big Spring, Tex., assignors to Cosden Oil & Chemical Company, Big Spring, Tex., a corporation of Delaware
No Drawing. Continuation-in-part of application Ser. No. 407,531, Oct. 29, 1964. This application Dec. 13, 1968, Ser. No. 783,758
Int. Cl. C08f 45/28
U.S. Cl. 260—33.6          6 Claims

ABSTRACT OF THE DISCLOSURE

Solid polyvinyl aromatics such as polystyrene are homogeneously mixed with a small quantity of light, water-white hydrogenated polybutene as a lubricant to impart low melt viscosity for casting or extrusion.

---

This invention is a continuation-in-part of our copending application, Ser. No. 407,531, filed Oct. 29, 1964, now abandoned, for a lubricant.

This invention relates to improved thermoplastic solid polymers lubricated with light liquid polybutenes. Solid polymer bodies, such as polyvinyl aromatics, particularly including polystyrene both crystal and impact types, as well as polyvinyl chlorides, have been blended in the art with small quantities of light mineral oils for purposes of lowering the melt viscosity of such hard polymers for ready flow during casting. The polybutene also reduces the heat distortion properties of the molded polystyrene. That blending practice of the hard polymer by the light oil reduces the melt viscosity during molding. Inasmuch as common mineral oil has been used for this purpose, such blending is commonly referred to in the art as lubricating, and the oil as a lubricant.

According to this invention it is found that light liquid polybutene blended with hard polyvinyl aromatic polymers in small quantity of about 0.1 to 6%, preferably about ½ to 3%, greatly improves the blend in these properties. For instance, light liquid polybutene lowers the melt viscosity, thereby making the heat-softened solid polymer easier to coat or to extrude. The light liquid polybutene also lowers the heat distortion of the cast or extruded polymer, improves its fatigue strength, its impact strength, and, in the lower viscosity ranges herein described, the polybutene liquid is more compatible with such solid polymers as polystyrene. Other improved properties are that the molded products have reduced surface gloss and the surface accepts printing or marking inks.

The light liquid polybutene useful herein has a molecular weight in the range of 112 to 600, preferably about 250 to 500, and a viscosity in the range of about 40 to 11,220 at 100° F., preferably below 1000 S.S.U. at 100° F., such as in the range of about 70 to 600 S.S.U. at 100° F. The solid polymer blended with the polybutene may be polystyrene, polymethylstyrene, polyethylvinyl benzene, copolymers of polystyrene with acrylonitrile, and particularly blends of said polymers as graft polymer with natural or synthetic rubbers. Such rubbers include GRS, polybutadiene of both emulsion and solution polymerized types, polyisoprene, copolymers of butadiene with acrylonitrile, and copolymers of butadiene with isobutylene, and the like. In forming such graft polymers the rubber preferably is dissolved in small quantity in the vinyl aromatic liquid monomer, and the solution is then polymerized. Similar polymers of polyvinyl chloride and polyvinylidene chloride may also be used as the solid polymer which is lubricated.

As polybutene we may use any of the liquid C$_4$ polymers within the viscosity-molecular weight ranges stated above. The polybutene liquid may be a polymer of isobutylene, of butene-1, or butene-2, or it may be a mixed polymer or copolymer of isobutylene and other olefines contained in a mixture of C$_1$-C$_5$ refinery gases containing substantial quantities of isobutylene and other olefine gases. The polymer may be formed as usual for forming a liquid polybutene, for instance, by Friedel-Crafts polymerization of butenes. A typical process for this is described in a U.S. patent to Jackson, 2,957,930. It may be formed by further polymerizing overhead light polymer volatiles of a polybutene process; for example, the Jackson process substantially as described in copending application Ser. No. 393,353, filed Aug. 31, 1964 and now Patent No. 3,375,295. It may alternatively be formed as described in copending application Ser. No. 407,416, filed Oct. 29, 1964, wherein gaseous monomer butene-1 or butene-2 are polymerized to liquid C$_4$ polymers alone or admixed with other C$_2$-C$_5$ olefine, preferably minor quantities of isobutylene. These liquid polybutenes, generally formed with a Friedel-Crafts catalyst, are substantially saturated, but since they have a slight oily odor and tend to become discolored in storage, they are preferably hydrogenated to convert the light liquid polymer to a very stable water-white liquid.

A preferred polymer liquid is hydrogenated according to United States Patent No. 3,100,808, and has the following characteristics:

TYPICAL HYDROGENATED POLYBUTENE

| | Polyisobutylene Grade OSH | Polyisobutylene Grade 3-SH |
|---|---|---|
| Molecular weight | 400 | 575 |
| Vis. SSU at 100° F | 148 | 11,200 |
| Vis. SSU at 210° F | 42 | 383 |
| Spec. grav. 60°/60° | .839 | .860 |
| Pounds per gal | 6.99 | 7.16 |
| Flash point C. O.C. ° F | 270 | 315 |
| Fire point C. O.C. ° F | 290 | 360 |
| Color-Cosden modified APHA [1] | 10 | 10 |
| Color after 24 hours at 250° F | 10 | 10 |
| Odor after 24 hours at 250° F | Bland | Bland |
| Acid No. (mg. KOH/gm.) | 0.01 | 0.01 |
| Free sulphur | None | None |
| Total ASTM sulphur D-129-58 | Nil | Nil |
| Carbon residue | Nil | Nil |
| Total chloride, wt. percent | 0.001 | 0.001 |
| Total iron, wt. percent | 0.001 | 0.001 |
| Moisture (p.p.m.) | 35 | 35 |
| Pour Point, ° F | −50 | −5 |

[1] American Public Health Association.

An outstanding advantage of the polybutene liquids used as a lubricant for the solid polymers is that in itself it has a quite low pour point both in substantial contrast to the tendency of paraffinic white mineral oils to solidify and crystallize out solid paraffins at lower temperatures. Thus, the polybutene liquids hereof are superior in many properties to the mineral oil of the art as a solid polymer lubricant, while being equally compatible with the solid polymer.

The white mineral oil of the art has been preferred heretofore because it maintains the colorless solid polymer with which it is used equally colorless, maintaining its purity for use in contact with foods, drugs or the like. Other types of hydrocarbon lubricants such as aromatic or naphthenic base oils have been specifically avoided because of their tendency to impart undesirable tastes, colors and odors to water-white polymer and foods or drugs contacted therewith. The polybutene hereof, equally inert as a lubricant liquid, preferably improved by slight hydrogenation under moderate conditions as described in United States Patent 3,100,808, is both colorless, ordorless, and more stable, a form preferred herein when the solid plastic to be lubricated is itself water white or is to be used for such food and drug contact uses where great purity is desired.

The following examples illustrate the practice of this invention:

EXAMPLE I

Polyisobutylene identified in the above table as OSH is mixed into a suspension mixture with styrene monomer in proportions set forth below:

| | Parts (by weight) |
|---|---|
| Water | 5000 |
| Calcium chloride ($CaCl_2 \cdot 2H_2O$) | 28 |
| Trisodium phosphate ($Na_3PO_4 \cdot 12H_2O$) | 39 |
| Sodium octyl sulfate | 6 |
| Styrene monomer | 5000 |
| Benzoyl peroxide | 12.5 |
| Lecithin | 0.047 |
| Polyisobutylene grade O-SH (as identified in the table above) | 100 |

The mixture is formed by charging 4500 parts of water to a reaction kettle, the trisodium phosphate and sodium octyl sulfate being added and dissolved with agitation. The calcium chloride is dissolved in the remaining water and this solution is gradually added to the reactor with agitation to form a fine dispersion of calcium hydroxyphosphate. Thereafter 4500 parts of styrene monomer are added, followed by the remaining 5000 parts of styrene in which the lecithin, the benzoyl peroxide, the acetic acid and the polyisobutylene OSH have been dissolved. Agitation is started, and a homogeneous dispersion is obtained. The temperature is then raised to 91° C. in about an hour and the agitation continued while heating for a period of about eight hours. The polystyrene thus formed consists of fine beads which are separated by filtration from the water bath, acidified to a pH of 3 with hydrochloric acid and centrifuged. After washing and drying in air, the solid beads are heated and charged to an extruder and are found to have a melt flow of 0.8 gram per ten minutes. (ASTM D-1238, Method 3). The plastic extruded and cut into small pellets has a heat distortion of 184° F. The same product formed as a control, but without the polyisobutylene OSH, had a melt flow of 0.4 gram per ten minutes and a heat distortion of 195° F. The lubricated product was water white with a low surface gloss, and slightly improved impact and fatigue strength in comparison with normal untreated polystyrene.

EXAMPLE II 100 parts styrene monomer having dissolved therein five parts of GRS rubber, has added thereto 0.5 part of mercaptan modifier and 0.5 part of polyisobutylene 3-SH as set forth in the above table, and polybutene having been hydrogenated slightly to water-white form as described in the U.S. Patent to Dyer 3,100,808, above. The styrene monomer solution containing the rubber and said polyisobutylene 3-SH is first polymerized by stirring for 20 hours at 105° C. and 0.3% benzoyl peroxide added and the entire mixture is added to the reaction kettle containing 100 parts of distilled water 0.6 part of trisodium phosphate, 0.78 part of calcium chloride, 3.0 parts of polyvinyl alcohol and 0.12 part of Anionic 08, a commercial water soluble wetting agent. The suspended mixture is agitated at 91° C. for eight hours and the temperature is then raised to 105° C. and the agitation continued to complete the polymerization in a total of twelve hours. The polymer beads are extruded into strips which are cut into small pellets. They are found to have a melt flow of 0.5 gram per ten minutes and the heat distortion is 190° F.

EXAMPLE III

The polymer mix of Example II, comprising 100 parts of styrene monomer, 20 parts of natural rubber, 0.03 part of mercaptan modifier and 2 parts of polyisobutylene 3-SH as set forth in the table above is polymerized en masse by continuous heating to a solid, the solid polymer having the same properties as the product of Example II.

EXAMPLE IV

Three parts of polyisobutylene OSH as set forth in the table above are added to 100 parts of a styrene polymer containing 6 parts of polybutadiene rubber. The liquid polyisobutylene is first dry mixed with the polymer which is in the form of small spherical beads. This mixture is fed to a two inch extruder operating at a temperature of 420° F. and 1,000 p.s.i. The polymer is thoroughly mixed with the said liquid polyisobutylene by the extruder and exist the machine as small ⅛" strands which are cooled and chopped to ⅛" cubes. Test specimens prepared from this polymer have a heat distortion of 187° F. and a melt flow of 0.97 gram per ten minutes. (ASTM D-1238, Method E).

Test specimens prepared from the base polymer used in the above blend gives a heat distortion of 200° F. and a melt flow of 0.312 gram per ten minutes. (ASTM D-1238, Method E).

EXAMPLE V

Three parts of a 450 molecular weight polybutene are added to 100 parts of a styrene polymer described in Example I. This material was processed in the same manner as that given in Example I. Test specimens prepared from this material gives a melt flow of 0.55 gram per ten minutes. (ASTM D-1238, Method E).

EXAMPLES VI-X

Each of the produced pellet products of Examples I through V were placed in a mold and heated to form integral castings and had the same melt flow, heat of distortion, and surface properties as set forth respectively in Examples I through V.

Certain modifications will occur to those skilled in the art. Water whitened characteristics have greatest utility for lubrication of water-white polymers and with polymers associated with products of highest purity requirements such as foods and drugs. The blended solid polymer may be further blended with other solid polymer modifying agents known in the art. Accordingly, it is intended that the description herein be regarded as exemplary and not limiting except as defined in the claims appended hereto.

What is claimed is:

1. A solid polyvinyl aromatic thermoplastic molding polymer in particulate form homogenously blended with 0.1 to about 6% of a liquid water-white hydrogenated polybutene lubricant having a viscosity not exceeding about 11,200 SSU at 100° F. to reduce the melt viscosity of the blend during hot forming.

2. A high impact polystyrene thermoplastic molding resin in particulate form homogeneously blended with 0.1 to about 6% of a liquid water-white hydrogenated polybutene lubricant having a viscosity not exceeding about 1000 SSU at 100° F. to reduce the melt viscosity of the blend during hot forming.

3. Solid polystyrene thermoplastic molding resin in particular form selected from the group consisting of polystyrene, polymethylstyrene, polyethylvinyl benzene, copolymers of polystyrene with acrylonitrile and blends of said polymers as graft polymer with natural or synthetic rubbers, homogeneously blended with from 0.1 to about 6% of liquid water-white hydrogenated polybutene lubricant having a viscosity not exceeding about 11,200 SSU at 100° F.

4. High impact solid polystyere thermoplastic molding resin in particulate form comprising a graft copolymer of styrene monomer and a preformed rubber polymer, homogeneously blended with about 0.1 to 6% of a liquid, water-white hydrogenated polybutene lubricant having a viscosity in the range of 40 to 1000 SSU at 100° F., and a molecular weight of 112 to 500.

5. The lubricated thermoplastic solid polymer as defined in claim 1 wherein the liquid polybutene is polyisobutylene.

6. The lubricated thermoplastic solid polymer as defined in claim 1 wherein the liquid polybutene lubricant is poly-n-butene.

References Cited

UNITED STATES PATENTS

| | | | |
|---|---|---|---|
| 2,636,018 | 4/1953 | Rubbens et al. | 260—886 |
| 2,957,930 | 10/1960 | Jackson | 260—683.9 |
| 3,100,808 | 8/1963 | Dyer | 260—683.9 |

OTHER REFERENCES

Mellan, Ibert: Industrial Plasticizers, MacMillan Co., New York, 1963, pp. 64, 65, 284, 285.

ALLAN LIEBERMAN, Primary Examiner

J. H. DERRINGTON, Assistant Examiner

U.S. Cl. X.R.

260—878, 880, 886